United States Patent [19]
Coffee

[11] Patent Number: 5,211,371
[45] Date of Patent: May 18, 1993

[54] LINEARLY ACTUATED VALVE

[75] Inventor: Curtis L. Coffee, Plainfield, Ind.

[73] Assignee: Advanced Control Technologies, Inc., Indianapolis, Ind.

[21] Appl. No.: 734,243

[22] Filed: Jul. 22, 1991

[51] Int. Cl.$^5$ .................. F16K 31/66; F16K 31/02
[52] U.S. Cl. ........................ 251/11; 60/527; 60/528
[58] Field of Search .............. 251/11; 60/528, 527

[56] References Cited

U.S. PATENT DOCUMENTS

| | | | |
|---|---|---|---|
| 4,577,607 | 3/1986 | Nishio | 123/516 |
| 4,714,193 | 12/1987 | Yogo | 236/75 |
| 4,736,587 | 4/1988 | Suzuki | 60/528 |
| 4,790,343 | 12/1988 | Mochizuki | 137/80 |
| 4,806,815 | 2/1990 | Honma | 310/307 |
| 4,932,429 | 6/1990 | Wantanabe et al. | 137/62 |
| 4,941,526 | 7/1990 | Nilsson | 165/32 |
| 4,973,024 | 11/1990 | Honma | 310/307 |

FOREIGN PATENT DOCUMENTS 0017789  1/1986  Japan ........................... 251/11

*Primary Examiner*—Arnold Rosenthal
*Attorney, Agent, or Firm*—Baker & Daniels

[57] ABSTRACT

The invention comprises a linearly actuated valve which includes a valve body, a valve seal linearly movable with respect to the body between closed and open positions, a spring and a shape memory alloy wire. The spring both biases the valve toward the closed position, and forms a part of the electrical circuit providing current to the shape memory alloy wire. The valve seal may be accurately positioned between the closed position and the open position by applying a pulse frequency modulated electrical current to the spring and the shape memory alloy wire. The electrical circuit is continuously closed and is comprised entirely of electrical conductors having no sliding electrical contacts to eliminate arcing and sparking.

33 Claims, 5 Drawing Sheets

LINEARLY ACTUATED VALVE

FIELD OF THE INVENTION

The present invention relates to linearly actuated valves and, more particularly, to linearly actuated valves which utilize an electrically controlled shape memory alloy member.

BACKGROUND OF THE INVENTION

Linearly actuated valves used to control the flow of fluids are often actuated by solenoids. Solenoid valves pose several shortcomings. Typically, they are heavy, require high voltage and high current, and are expensive and difficult to manufacture, in part because tight component tolerances are required. Solenoid valves generate heat and create external magnetic fields which may affect other elements in a system or even prohibit the use of such valves in certain thermal or magnetic sensitive applications. Finally, precision control of the valve is difficult and the response time of the valve is slowed by the requirement of the relatively large mass of the plunger.

Several other U.S. patents namely, U.S. Pat. Nos. 4,577,607, 4,714,193, 4,790,343, 4,932,429, and 4,941,526, disclose valves which utilize shape memory alloy springs for actuation. The shape memory alloy members respond to ambient temperature, not electric current. In the valves disclosed in U.S. Pat. Nos. 4,577,607 and 4,714,193, a solenoid is used to override the valve position created by the shape memory alloy spring members. The valves in these patents have the common shortcoming of being unable to quickly and accurately control the extent to which the valve is open.

Applying an electric current to a shape memory alloy member to actuate a valve is disclosed in U.S. Pat. Nos. 4,736,587 and 4,973,024. The electromechanical valve disclosed in U.S. Pat. No. 4,736,587 uses two shape memory alloy springs controlled by an electric circuit. The springs can either be in a compressed or a relaxed state and are controlled by a circuit which provides current to either of the springs (but not both) to toggle an inlet port to either of two outlet ports. Therefore, continuous current is not necessarily applied to the shape memory alloy springs in this invention and the extent to which the valve is positioned between open and closed positions is not accurately controllable.

The manufacture of shape memory alloy springs is sometimes difficult as the element must be taught to be in such a coiled shape. Also, when subjected to an electric current, shape memory alloy springs may be susceptible to temperature gradients which may deform the coiled shape, and, therefore, portions of the shape memory alloy spring may not attain the proper temperature for phase transformation. Finally, coil-shaped memory alloys do not have as great a recovering force as linearly-shaped memory alloys, as the amount of deformation, and hence recovering force, of the spring is maximum only at the surface of the member and weakens toward the center.

The valve disclosed in U.S. Pat. No. 4,973,024 uses a shape memory alloy wire which is controlled by an electric circuit. Specifically, a contact member, such as the valve casing, is in contact with the metal plunger of the valve when the electric circuit is closed. The circuit is open when the valve plunger retracts from the contact member. During movement of the plunger, this metal-to-metal contact can result in sparking or arcing and, therefore, limited control of the valve. Control is also limited because continuous control, or current, is not applied to the shape member alloy after the plunger has moved enough to break the electrical circuit. U.S. Pat. Nos. 4,973,024 and 4,806,815 suggest the use of pulse width modulation for actuation to control the shape memory alloy members.

OBJECTS OF THE INVENTION

Accordingly, it is an object of the present invention to provide a linearly actuated valve that is inexpensive, lightweight and constructed from as few pieces as possible.

It is another object of the present invention to provide a linearly actuated valve which is constructed from components requiring lower mechanical tolerances.

It is another object of the present invention to provide a linearly actuated valve which contains few components which are composed of metal.

It is another object of the present invention to provide a linearly actuated valve that is noise-free, and does not generate heat or a magnetic field.

It is another object of the present invention to provide a linearly actuated valve which can be operated with low current and low power requirements.

It is another object of the present invention to provide a linearly actuated valve which linearly controls the valve orifice.

It is another object of the present invention to provide a linearly actuated valve which has an improved response time.

It is another object of the present invention to provide a linearly actuated valve which utilizes a shape memory alloy which is a wire.

It is another object of the present invention to provide a linearly actuated valve which utilizes a shape memory alloy which is heated evenly when subjected to an electric current.

SUMMARY OF THE INVENTION

The invention comprises a linearly actuated valve which includes a valve body, a valve seal linearly movable with respect to the body between closed and open positions, a spring and a shape memory alloy wire. The spring both biases the valve toward the closed position, and forms a part of the electrical circuit providing current to the shape memory alloy wire. The valve seal may be accurately positioned between the closed position and the open position by applying a pulse frequency modulated electrical current to the spring and the shape memory alloy wire. The electrical circuit is continuously closed and is comprised entirely of electrical conductors having no sliding electrical contacts to eliminate arcing and sparking.

DETAILED DESCRIPTION

Figure 1:
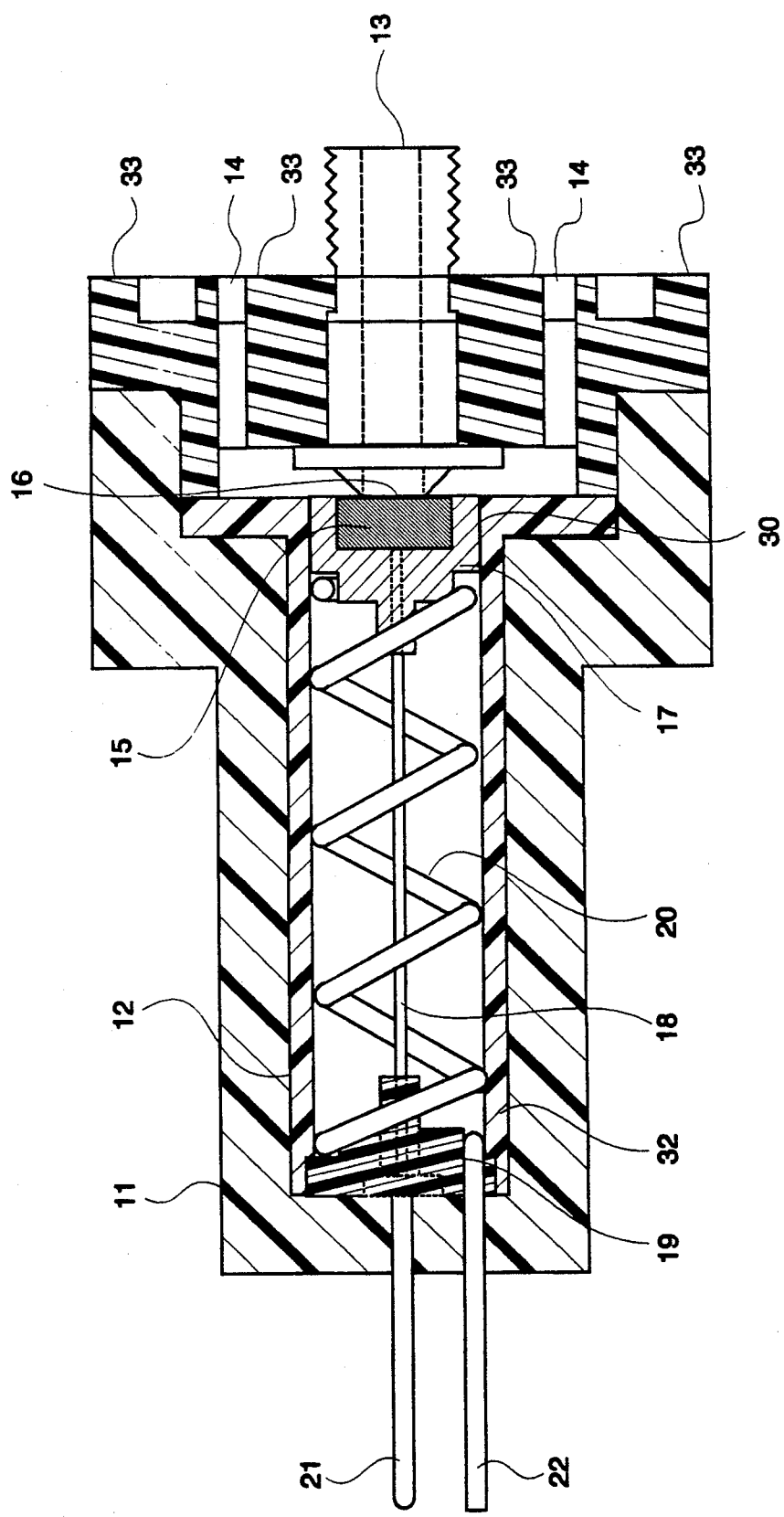
FIG. 1 shows a longitudinal cross-sectional view of one embodiment of the present invention in its closed state.

Referring now to FIG. 1, there is shown a longitudinal cross-sectional view of a linearly actuated valve in accordance with the present invention in which the valve is in its closed state. The linearly actuated valve consists of plastic cylindrical valve body 11 with bore 12 inside body 11 in the longitudinal direction. Inlet valve port 13 and outlet valve ports 14 and 14' provide a connection between bore 12 and the exterior of body 11. Actuator member 30, which may include a valve seal 15, engages inlet valve port 13 when the valve is in its first, or closed, position, and is linearly movable. When in its first position, valve seal 15 closes the connection between inlet valve port 13 and outlet valve ports 14 and 14' at valve seal surface 16. Valve seal 15 is affixed to metal seal holder 17 through which shape memory alloy means 18 is connected at one of its ends. Shape memory alloy means 18, which may be comprised of a six (6) millimeter in diameter BIOMETAL(TM) nickel-titanium wire produced by Toki Corporation of Japan and available from Mondo-tronics of Cupertino, Calif., is positioned longitudinally within plastic sleeve 32 and is also connected at its other end to stop 19 which is positioned within bore 12 and attached to body 11. Shape memory alloy means 18 is crimped within seal holder 17 at one end and to plastic stop 19 at the opposite end to thereby connect it to body 11. Also positioned within bore 12 is an electrically conductive bias means 20, which may comprise a spring. The ends of bias means 20 are connected to electrically conductive seal holder 17 and to stop 19 which is electrically non-conductive. Bias means 20 as shown is under compression between seal holder 17 and stop 19. Bias means 20 may be friction fit between seal holder 17 and stop 19 or may be welded or soldered to seal holder 17. First and second electrical terminals 21 and 22 extend from the exterior of body 11 to points of contact within bore 12 at stop 19. Specifically, electrical terminal 21 is in contact with shape memory alloy means 18 at stop 19. Electrical terminal 22 is in contact with bias means 20 at stop 19 and electrical terminal 22 may be an extension of bias means 20. Electrical terminals 21 and 22 connect with the electrical circuit shown in FIG. 3. Body 11 and sleeve 32 are constructed of non-conductive material such as plastic. Thus, electrical terminal 21, shape memory means 18, seal holder 17, spring 20 and electrical terminal 22 combine to form a continuously closed electrical circuit means comprised of electrical conductors having no sliding electrical contacts.

Figure 2:
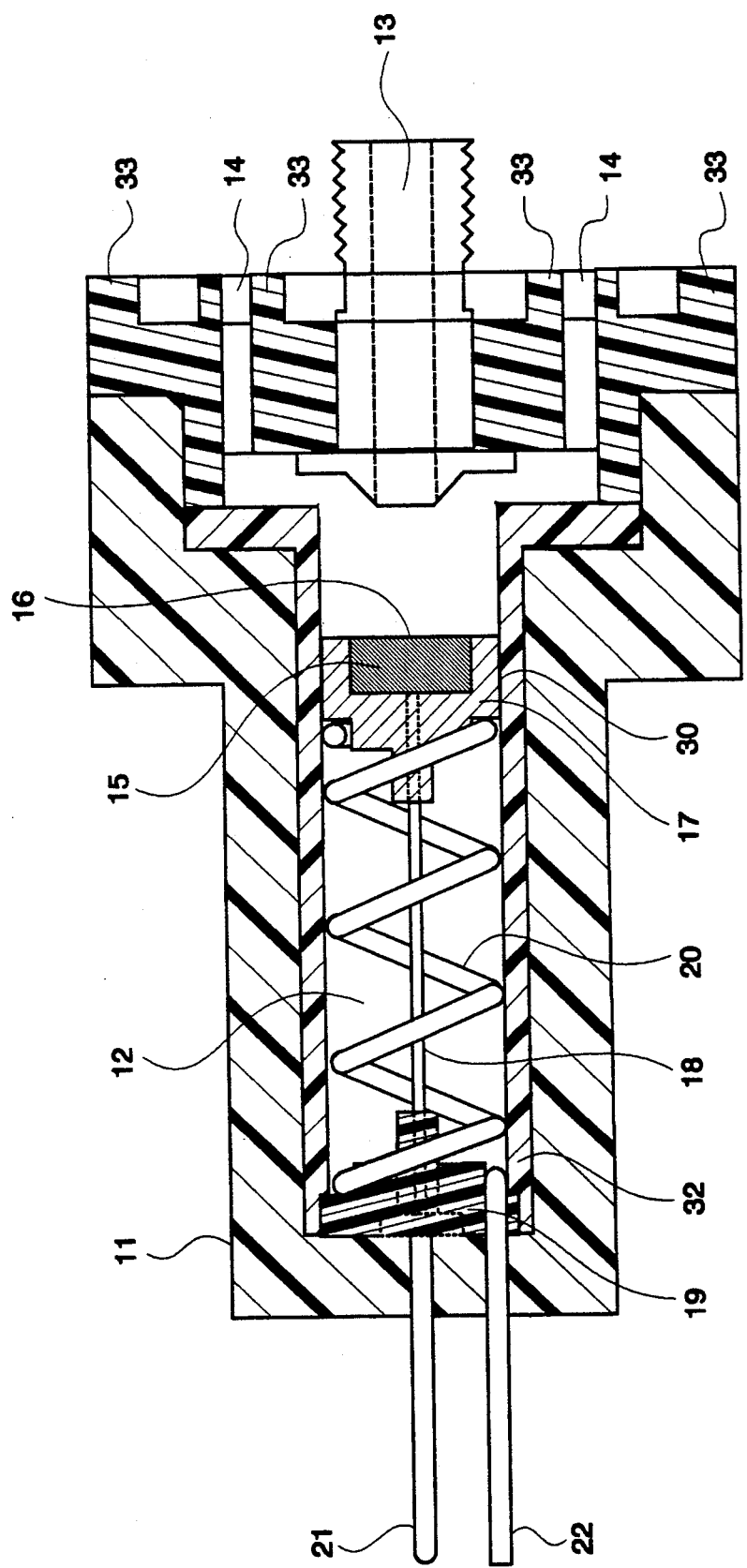
FIG. 2 shows a longitudinal cross-sectional view showing the embodiment of FIG. 1 in its open state.
Figure 4:
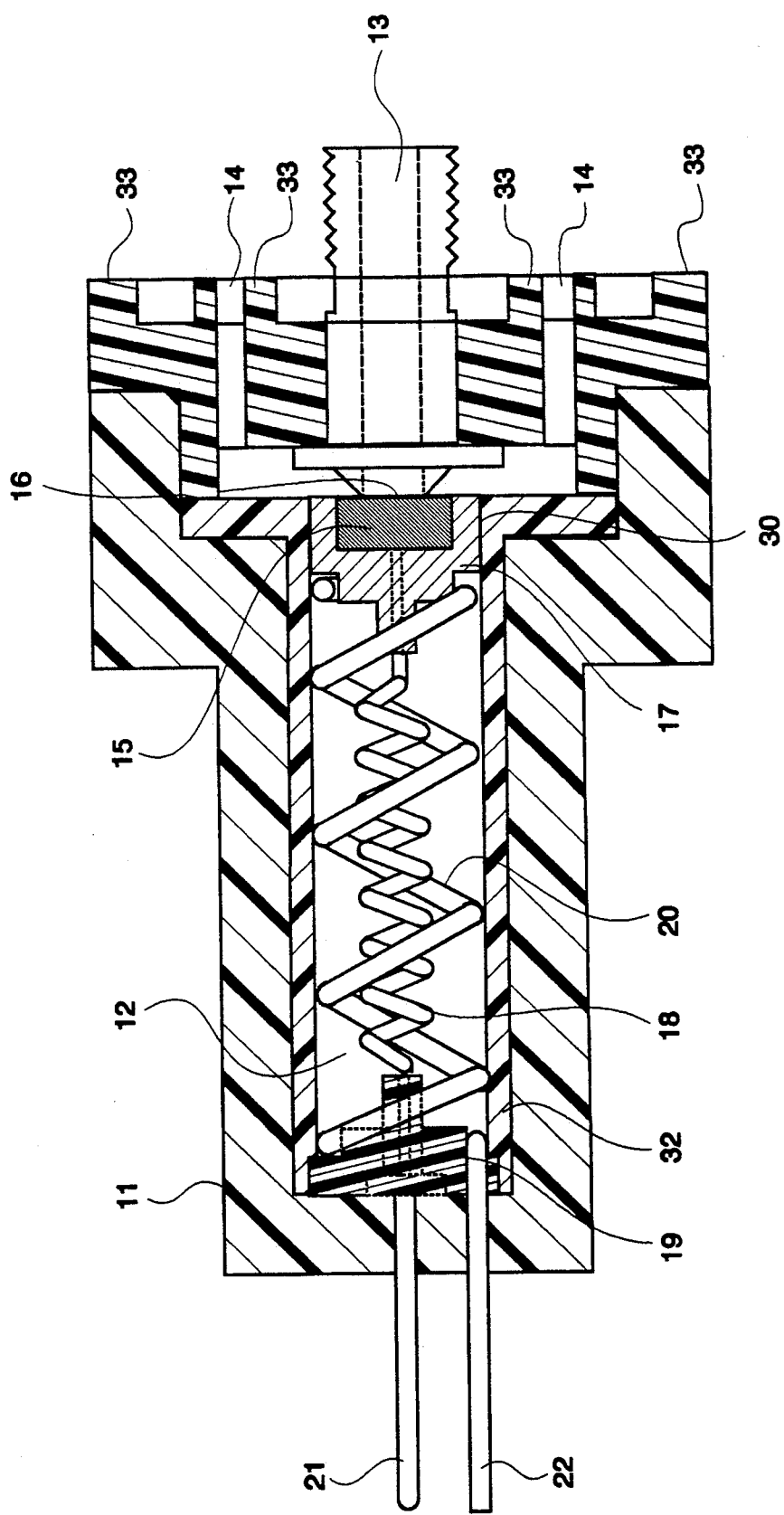
FIG. 4 shows a longitudinal cross-sectional view of a second embodiment of the present invention in which the shape memory alloy is a coil.

Face seal 33 may be constructed from a resilient material to provide a good seal such as rubber or plastic. Face seal 33 includes four outlet channels (two of which, 14 and 14', are shown in FIGS. 1, 2 and 4). The valve may be connected to another device by screwing in the threaded end of inlet valve 13 into an appropriately threaded receptacle on that device until face seal 33 lies flush against a matching surface on the device, that matching surface having outlet and inlet ports accommodating the outlet and inlet ports of the valve.

FIG. 2 shows the linearly actuated valve illustrated in FIG. 1 in its second, or open, position. In the second position, valve seal surface 16 does not engage inlet port 13 and thereby opens the connection between inlet port 13 and outlet ports 14 and 14'.

Figure 3:
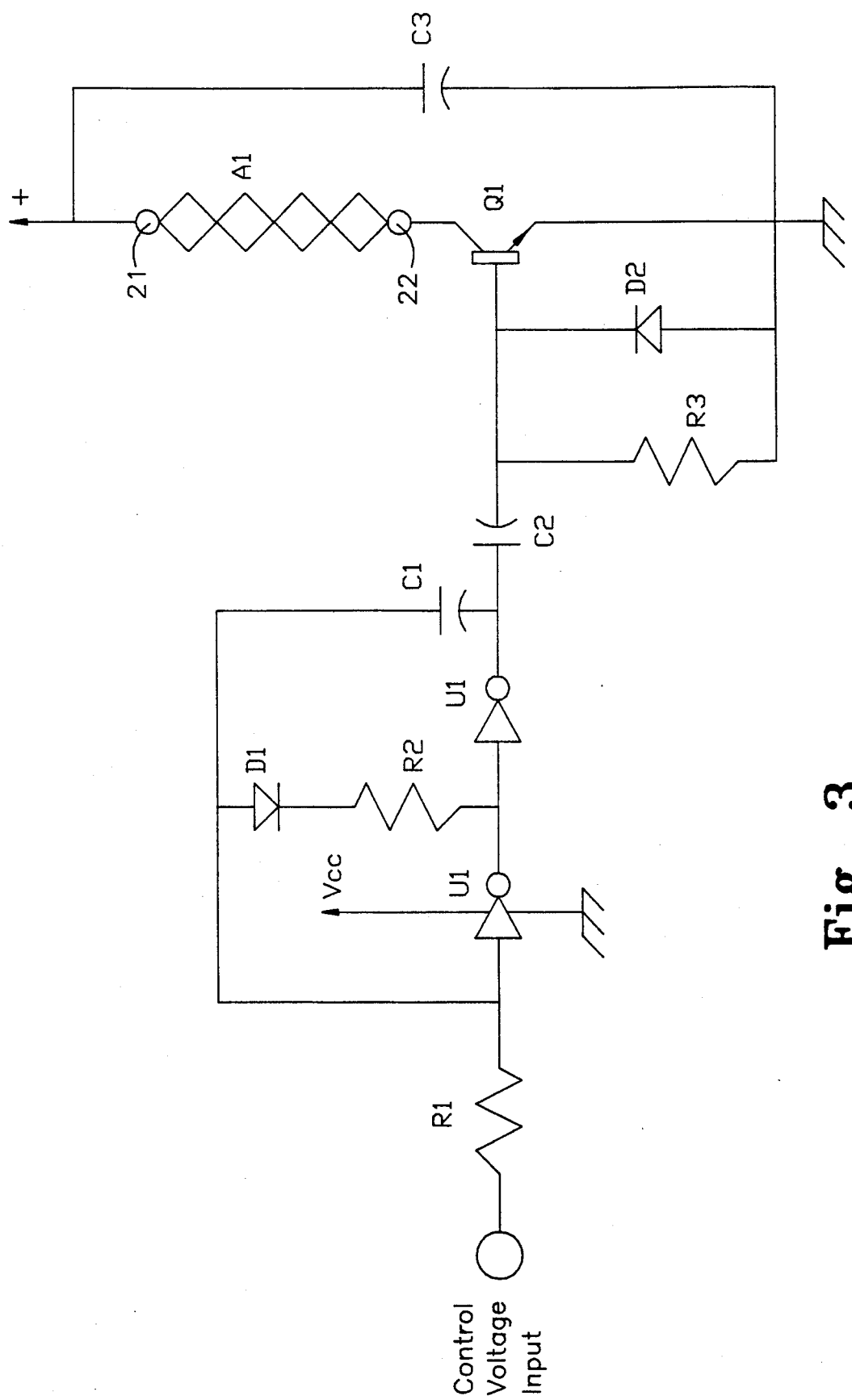
FIG. 3 shows a schematic diagram for the electrical circuit used to control the actuator of the present invention.

Movement between the first, or closed, position, and the second, or open, position is achieved by applying sufficient electrical current to electrical terminals 21 and 22 by, for example, through the circuit shown in FIG. 3. When shape memory alloy means 18 is subjected to such current, it decreases in length, to longitudinally move valve seal holder 17 toward stop 19 against the compression force of bias means 20 from stop 19 toward valve seal holder 17, valve seal 15 will move longitudinally from its first position to its second position in which valve surface 16 no longer engages inlet port 13. Decreasing or eliminating such a current, combined with the force of bias means 20, causes shape memory alloy means 18 to increase in length toward the position shown in FIG. 1. Varying the current supplied to shape memory alloy means 18 varies the amount the valve opens.

FIG. 3 shows a variable frequency electrical pulse circuit that may be used in conjunction with the linearly actuated valve. Electrical terminals 21 and 22 are connected to the actuator driver circuit as indicated. A control voltage that may vary between zero (0) volts and Vcc is provided to the circuit where indicated. Resistors R1 (2.2M ohms) and R2 (20K ohms), invertors U1 (CD4049BCN), diode D1 (1N4148) and capacitor C1 (470 pF) form a voltage controlled oscillator. The resulting frequency of the oscillator is proportional to the control voltage provided to the circuit, i.e., the higher the voltage provided, the higher the frequency. The values of capacitor C1, resistor R1, and resistor R2 may be modified to alter the resulting frequency. For example, the larger the value of capacitor C1, the lower the resulting frequency.

Capacitor C2 (0.01 uF) and resistor R3 (100K ohms) form a half monostable which provides a very short trigger pulse to NPN transistor Q1 for every cycle produced by the oscillator. Diode D2 (1N4004) protects transistor Q1 from negative voltage spikes that may be generated by the half monostable and assists in the improving the rate of recharging for capacitor C2. Transistor Q1 is switched on for the length of time equivalent to each cycle. An increase in the frequency generated by an increase in control voltage increases the frequency with which transistor Q1 is turned on. An increase in the frequency that the transistor is turned on increases the amount of power provided to shape memory alloy member A1, increasing its temperature shortening it. Capacitor C3 (470 uF) filters Vcc from voltage transients when Q1 switches.

It will be appreciated by those skilled in the art that shape memory alloy member A1 is directly controlled by varying pulse frequency. The analog control voltage provided to the actuator driver circuit is converted to a frequency by the voltage controlled oscillator portion of the actuator driver circuit which, in turn, is then converted to a signal composed of fixed length pulses emitted at the appropriate frequency. This signal drives transistor Q1 which provides power to shape memory alloy member A1 to accurately control the extend to which the valve is opened or closed. Thus, the valve may be used in precision applications such as for an electric to pressure transducer. The circuit of FIG. 3 may be combined with a closed loop feedback system such as that shown in U.S. Pat. No. 4,705,067, which is incorporated herein by reference.

FIG. 4 shows a longitudinal cross-sectional view of a linearly actuated valve in accordance with a second embodiment of the present invention in which the valve is in its closed state. In this embodiment, shape memory alloy means 18 is comprised of a coil spring. The linearly actuated valve illustrated in FIG. 4, similar to the valve illustrated in FIG. 1, will be in its second, or open, position (not shown), when valve seal surface 16 no longer engages inlet port 13. Operationally, movement of valve seal 15 from the first position to the second position and movement of valve seal 15 from the second position to the first position is the same as is described for the first embodiment illustrated in FIGS. 1 and 2.

Figure 5:
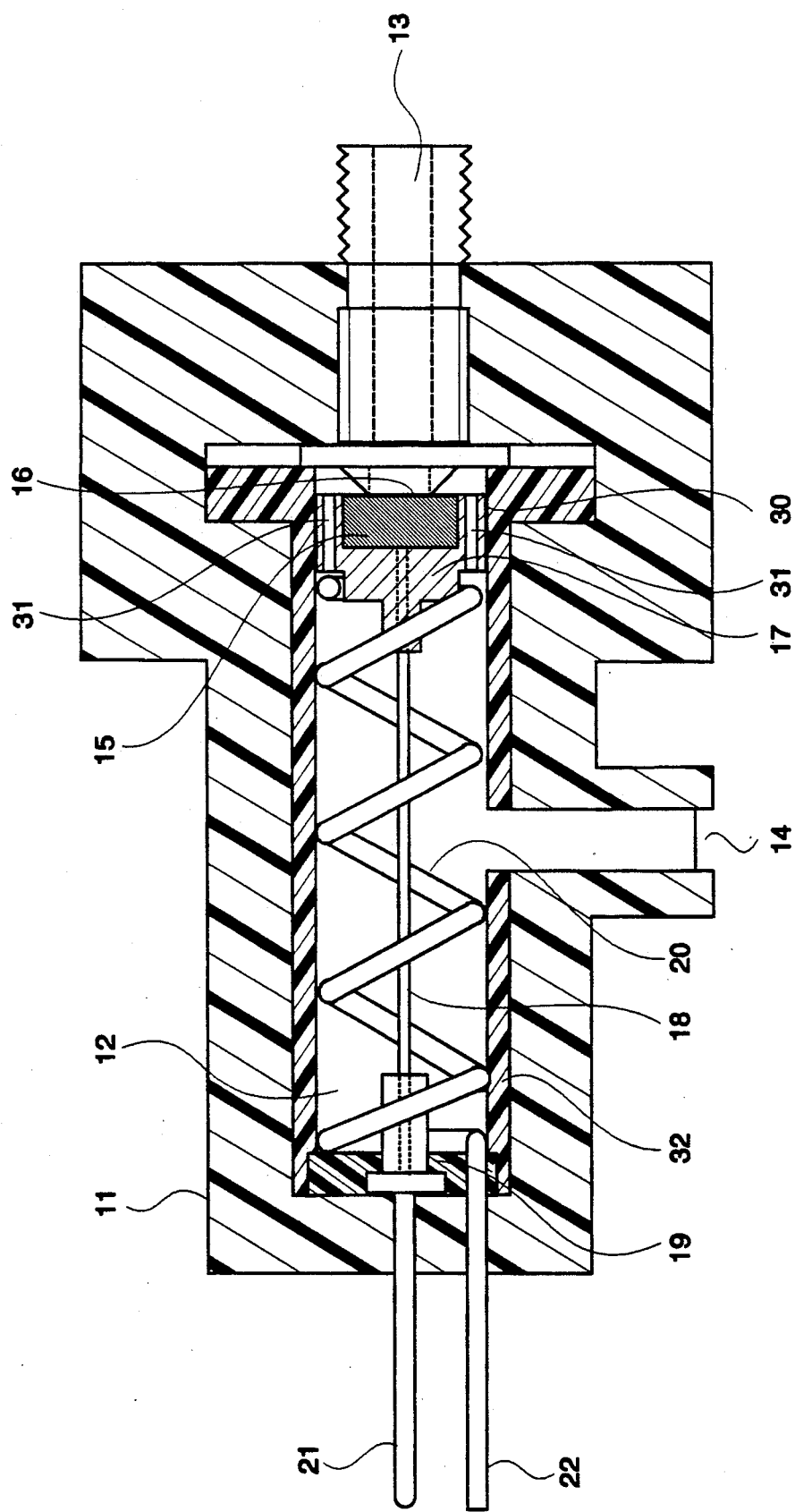
FIG. 5 shows a longitudinal cross-sectional view of a third embodiment of the present invention in which the valve ports are on opposite sides of the valve seal.

FIG. 5 shows a longitudinal cross-sectional view of a linearly actuated valve in accordance with a third embodiment of the present invention in which the valve is in its closed state. In this embodiment, outlet valve port 14 is located on the opposite side of seal holder 17 from inlet valve port 13 with respect to the longitudinal axis of bore 12. Seal holder 17 has channels 31 therein. When in its first, or closed, position, valve seal 15 closes the connection between inlet port 13 and outlet port 14. When the linearly actuated valve of this embodiment is in the second, or open position (not shown), valve seal surface 16 no longer engages inlet port 13 thereby opening the connection between inlet valve 13 and outlet valve 14 through channels 31 and bore 12. Operationally, movement of valve seal 15 between the first and second positions is the same as for the first embodiment illustrated in FIGS. 1 and 2.

It will be further appreciated by those skilled in the art that the linearly actuated valve of the present invention is composed of a minimal number of components of which few are metal and few require tight machining tolerances. This, together with the use of plastic components, assists in minimizing the component cost, manufacturing cost, size and the weight of the valve. The valve requires low current and power and, does not emit heat or a magnetic field that could interfere with other elements of a system. The actuator linearly controls the valve orifice and has a relatively low response time.

I claim:

1. A linearly actuated valve of the type comprising a valve body, a valve seal linearly movable with respect to the body between first and second positions, bias means biasing the valve seal toward the first position, a shape memory alloy means separate from the bias means and disposed between the valve seal and the body, electrical circuit means for providing electrical current to the shape memory alloy such that the valve seal is moved from the first position to the second position when current is applied thereto, the improvement comprising,
the electrical circuit being continuously closed and comprised entirely of electrical conductors having no sliding electrical contacts.

2. The linearly actuated valve of claim 1 wherein the body further comprises inlet and outlet valve ports, and the valve seal is engagable with one of the valve ports.

3. The linearly actuated valve of claim 2 wherein the inlet and outlet ports are positioned on the same side of the valve seal with respect to the longitudinal axis of the bore.

4. The linearly actuated valve of claim 2 wherein the inlet and outlet ports are positioned on opposite sides of the valve seal with respect to the longitudinal axis of the bore.

5. The linearly actuated valve of claim 1 wherein the shape memory alloy means comprises a straight wire.

6. The linearly actuated valve of claim 1 wherein the shape memory alloy means comprises a spring.

7. The linearly actuated valve of claim 1 wherein the shape memory alloy means and the bias means are coaxial.

8. The linearly actuated valve of claim 7 wherein the bias means comprises a coil spring.

9. The linearly actuated valve of claim 8 wherein the shape memory alloy means is positioned within the coil spring.

10. The linearly actuated valve of claim 1 further comprising a variable frequency electrical pulse means connected to the electrical circuit.

11. The linearly actuated valve of claim 10 wherein the pulse frequency of the pulse means is responsive to an analog control voltage input.

12. A linearly actuated actuator of the type comprising an actuator body, a member linearly movable with respect to the body between first and second positions, said member includes a valve seal, a coil spring biasing the member toward the first position, a shape memory alloy means disposed between the member and the body and within the coil spring, electrical circuit means for providing electrical current to the shape memory alloy such that the member is moved from the first position to the second position when current is applied thereto, the improvement comprising.
the electrical circuit being continuously closed regardless of the position of the actuator and comprised entirely of electrical conductors having no sliding electrical contacts.

13. The linearly actuated actuator of claim 12 wherein the body further comprises inlet and outlet valve ports, and the valve seal is engagable with one of the valve ports.

14. The linearly actuated actuator of claim 13 wherein the inlet and outlet ports are positioned on the same side of the member with respect to the longitudinal axis of the bore.

15. The linearly actuated actuator of claim 13 wherein the inlet and outlet ports are positioned on opposite sides of the member with respect to the longitudinal axis of the bore.

16. A linear motion actuator comprising:
a body,
a member movable in a linear direction between first and second positions with respect to the body, wherein the member includes a valve seal,
a shape memory alloy means having opposing ends and extended in a direction parallel to the linear direction, the shape memory alloy means being operatively connected to the member at one end and to the body at its opposite end,
electrically conductive bias means separate from the shape memory alloy means, biasing the member toward the first position and away from the second position,
the bias means having a first end connected to the member and a second end connected to the body,
the bias means being electrically connected to the shape memory alloy means,
a first electrical terminal connected to the end of the shape memory alloy that is connected to the body,
a second electrical terminal connected to the end of the bias means that engages the body, such that the member may be moved from the first position to the second position by applying an electrical current to the first and second terminals such that the current passes through the bias means and the shape memory alloy means.

17. The linear motion actuator of claim 16 wherein the body further comprises inlet and outlet valve ports, and the valve seal is engagable with one of the valve ports.

18. The linear motion actuator of claim 17 wherein the inlet and outlet ports are positioned on the same side of the member with respect to the longitudinal axis of the bore.

19. The linear motion actuator of claim 17 wherein the inlet and outlet ports are positioned on opposite sides of the member with respect to the longitudinal axis of the bore.

20. The linearly actuated actuator of claim 12 wherein the electrical circuit includes the coil spring.

21. The linearly actuated actuator of claim 12 wherein the shape memory alloy means comprises a straight wire.

22. The linearly actuated actuator of claim 12 wherein the shape memory alloy means comprises a spring.

23. The linearly actuated actuator of claim 12 wherein the shape memory alloy means and the coil spring are coaxial.

24. The linearly actuated actuator of claim 23 wherein the shape memory alloy means is positioned within the coil spring.

25. The linearly actuated actuator of claim 12 further comprising a variable frequency electrical pulse means connected to the electrical circuit.

26. The linearly actuated actuator of claim 25 wherein the pulse frequency of the pulse means is responsive to an analog control voltage input.

27. The linear motion actuator of claim 16 wherein the shape memory alloy means comprises a straight wire.

28. The linear motion actuator of claim 16 wherein the shape memory alloy means comprises a coil spring.

29. The linear motion actuator of claim 16 wherein the shape memory alloy means and the bias means are coaxial.

30. The linear motion actuator of claim 29 wherein the bias means comprises a coil spring.

31. The linear motion actuator of claim 30 wherein the shape memory alloy means is positioned within the coil spring.

32. The linear motion actuator of claim 16 further comprising a variable frequency electrical pulse means connected to the electrical circuit.

33. The linear motion actuator of claim 32 wherein the pulse frequency of the pulse means is responsive to an analog control voltage input.

* * * * *